United States Patent Office 3,775,399
Patented Nov. 27, 1973

3,775,399
N-OXIDE OF POLY I:POLY C
Michael Raymond Harnden, Horsham, England, assignor to Beecham Group Limited, Brentford, Middlesex, England
No Drawing. Filed Apr. 29, 1971, Ser. No. 138,783
Claims priority, application Great Britain, May 8, 1970, 22,302/70
Int. Cl. C07d 51/50
U.S. Cl. 260—211.5 R                         3 Claims

ABSTRACT OF THE DISCLOSURE

N-oxides and salts of Poly I:Poly C which are themselves double-stranded, methods of making such N-oxides and salts and pharmaceutical compositions thereof are described. The new Poly I:Poly C derivatives have reduced toxicity and are characterized by broad antiviral activity. The methods comprise oxidation with hydrogen peroxide or a peracid which is controlled to avoid separation of the double-stranded material into single-stranded material.

---

This invention relates to N-oxides of a synthetic polynucleotide, to a method for making such N-oxides and to pharmaceutical compositions containing them.

Polyriboinosinic acid combines with polyribocytidylic acid to form a double-stranded complex wherein a single strand of polyriboinosinic acid (Poly I) is associated by hydrogen bonding with a single strand of polyribocytidylic acid (Poly C) for forming a double-stranded material. The resulting double-stranded material is commonly known as Poly I; Poly C and it is known to be capable of inducing interferon production in both cell cultures and in animals. More recently Poly I:Poly C has been shown to be an active antiviral agent in man, giving protection against several types of virus infection.

However, Poly I:Poly C shows certain toxic side-effects which appear to become more apparent with increasing dosages. This invention is based on the discovery that certain derivatives of Poly I:Poly C are less toxic than the parent material and yet retain good interferon inducing activity.

According to the present invention there is provided N-oxides of Poly I:Poly C and salts thereof, said N-oxides being themselves double-stranded.

The salts of the present invention may be ammonium salts or alkali metal salts (e.g. sodium or potassium salts); salts with organic bases such as amines; and salts with polybasic organic materials such as polylysine and D.E.A.E. dextran.

The cytosine base radicals which are present in a molecule of polyribocytidylic acid may be represented by Formula I below, and these base radicals may in theory be oxidised to give N-oxides of Formula II:

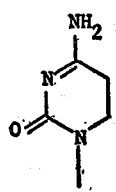  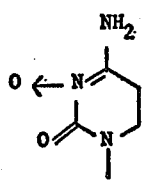

(I)                          (II)

The hypoxanthine base radicals which are present in a molecule of polyriboinosinic acid may be represented by Formula III below, but it is likely that the hypoxanthine bases are not converted to N-oxides (at least to any significant extent):

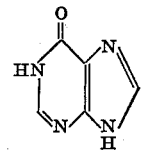

(III)

Thus in the N-oxides of the present invention at least some base sites on the polyribocytidylic acid strand are oxidised while the hypoxanthine bases on the polyriboinosinic strand are unoxidised. It will be clear that various degrees of oxidation of Poly I:Poly C can be achieved, giving products ranging from those in which only a very small proportion of the total oxidisable base sites are oxidised, to those wherein the majority of the oxidisable base sites are oxidised. We have found that as the degree of oxidation increases, i.e. as more and more of the cytosine base sites are oxidised, the double-stranded molecule becomes more and more likely to separate into single-stranded material. Since this invention relates only to those N-oxides which are themselves double-stranded, it follows that the N-oxides of this invention have at least some un-oxidised base sites along the length of the molecule.

The degree of oxidation of the double-stranded N-oxides of this invention may be measured by an empirical method. The ultra-violet spectrum of Poly I:Poly C exhibits absorptions at 258 m$\mu$. and at 230 m$\mu$. As more and more of the bases in the double-stranded molecule are oxidised, the absorption at 230 m$\mu$. increases with respect to the absorption at 258 m$\mu$. Thus the ratio of absorptions at the two wavelengths is a measure of the degree of N-oxidation of the Poly I:Poly C, i.e. the ratio:

$$\frac{\text{absorption at 230 m}\mu}{\text{absorption at 258 m}\mu} \text{ (increases as the degree of oxidation increases).}$$

(NB. said ratio will hereafter be written as $A\frac{230 \text{ m}\mu}{258 \text{ m}\mu}$)

Two other parameters which we employ to measure the degree of oxidation of the materials of this invention are the hyperchromicity of the material and its Tm value. These parameters are obtained by recording the U.V. absorption of the material at a particular frequency, while gradually raising the temperature of the material. The U.V. absorption of a double-stranded RNA at 258 m$\mu$ is always less than the absorption at the same frequency of the same material in single stranded form. Also, as the temperature of the double-stranded material is increased, the hydrogen bonding between strands becomes weaker until ultimately the strands separate. It therefore follows that the U.V. absorption value of a double-stranded material will increase with increasing temperature. The difference between the two extremes of absorption expressed as a percentage of the absorption of the double-stranded material, is termed the "hyperchromicity" of that material.

When the U.V. absorption at 258 m$\mu$ of the N-oxides of this invention is plotted against temperature, it is found that the absorption is greater at high temperatures than at low temperatures. The increase in absorption is a gradual one and it is possible to locate the temperature at which the absorption is half way between the absorption of the double-stranded material and that of the single-stranded material. This temperature is designated in Tm of the N-oxide and is dependent on the degree of oxidation and we find that the Tm decreases with increasing degree of oxidation.

In another of its embodiments, the present invention provides a method for the preparation of double-stranded N-oxides of Poly I:Poly C and salts thereof, comprising *either* (a) reacting Poly I:Poly C or a salt thereof with hydrogen peroxide or a peracid for a length of time and at a temperature sufficient to cause oxidation of at least some of the cytosine bases but insufficient to cause separation of the double-stranded material into single stranded material *or* (b) reacting Poly C or a salt thereof with hydrogen peroxide or a peracid for a length of time and at a temperature sufficient to cause oxidation of at least some but no more than 26% of the cytosine bases and subsequently contacting the resultant Poly C N-oxide or salt thereof with Poly I or a salt thereof to form the desired double stranded N-oxide or salt thereof.

When Poly I:Poly C is employed as a starting material, and the double-stranded material is oxidised, it is unfortunately not possible to put a universally applicable upper limit on the degree of oxidation beyond which single stranded materials are obtained. Such an upper limit is primarily dependent on the temperature and to a lesser extent on the length of time for which oxidation is carried out, but it is a routine matter to determine the most suitable reaction conditions for any required degree of oxidation. However, when Poly C is oxidised and then annealed with Poly I to form the double-stranded N-oxide, we have found little or no double-stranded material forms when more than about 26% of the cytosine bases are oxidised.

Suitable peracids for use in the method of this invention include peracetic, perbenzoic, monoperphthalic or m-chloroperbenzoic acid. Of these peracids we prefer to use m-chloroperbenzoic acid since the reaction proceeds smoothly and controllably with this material.

The reaction is usually carried out in a suitable solvent for the Poly I:Poly C or the Poly C itself. Suitable solvents are usually slightly alkaline to facilitate the solution e.g., potassium acetate in water and ethanol pH about 8 is usually a suitable reaction medium. In this case the product is obtained in potassium salt form.

The temperature at which the reaction takes place is not critical to the present invention. We prefer to avoid very low temperatures, at which the reaction proceeds extremely slowly, and very high temperatures at which there is grave risk of destroying the double-stranded nature of the product. Generally we find room temperatures (about 20–25° C.) to be convenient, although a temperature of from 5° C. to 50° C. would be suitable.

The reaction time will vary according to the degree of oxidation required and the temperature of the reaction mixture. When a reaction temperature of about 20° C. is employed and m-chloroperbenzoic acid is employed as the oxidising agent, the degree of oxidation of the product gradually increases over a period of several hours.

The N-oxides of the present invention may be recovered from the reaction medium by antisolvent precipitation. A suitable antisolvent for the N-oxides is ethanol. The precipitate itself is conveniently collected by centrifugation. Any of the common purification procedures for nucleic acids may be applied to the product of this invention, e.g. chromatography and electrophoresis.

As has been indicated earlier, the double-stranded N-oxides of this invention are capable of inducing interferon production in animals and man and they are generally less toxic than the parent Poly I:Poly C, as demonstrated by toxicity studies in animals such as mice, while retaining good antiviral activity.

Since interferon is a non-specific antiviral agent, it follows that the N-oxides of this invention are of value in the prophylaxis and treatment of a wide range of virus infections such as those due to Coxsackie virus, Semliki Forest virus, vaccinia virus, foot and mouth disease virus, versicolor stomatitis virus, rabies virus and influenza virus.

Hence in another of its embodiments, the present invention provides a pharmaceutical composition comprising one or more of the double-stranded N-oxides of Poly I:Poly C or non-toxic salts thereof in admixture with one or more pharmaceutically acceptable carriers.

The composition of this invention may be formulated in aerosol form e.g. for intranasal administration, in injectable form for intraperitoneal injection, or in a form suitable for topical application, although clearly the formulation employed will be adapted according to the nature of the infection. In general, the present compositions are most effective in the prophylaxis of viral infections, although they are also effective in the treatment of such infections.

Although the N-oxides and compositions of this invention are most useful as antiviral agents, they also have utility as adjuvants in enhancing the immune response.

The present invention will now be illustrated in some of its embodiments in the following examples:

EXAMPLE 1

Polyribocytidylic acid (10.0 mg. as the potassium salt) and polyriboinosinic acid (10.0 mg. as the potassium salt) were dissolved in 0.4 M aqueous potassium acetate pH 8.2 (10 ml.) and a solution of m-chloroperbenzoic acid (500 mg.) in ethanol (10 ml.) added. The solution was allowed to remain at 20° C. for 1 hour and then ethanol (60 ml.) was added. The precipitate was separated by centrifugation and washed with ethanol (2× 100 ml.).

A sample of the N-oxidised product obtained in this way was dissolved in 0.3 M aqueous sodium chloride containing 1% ethylene glycol and the ratio $$A \frac{230 \text{ m}\mu}{258 \text{ m}\mu}$$

was measured. The ratio $$A \frac{230 \text{ m}\mu}{258 \text{ m}\mu}$$

for unoxidised Poly I:Poly C was then measured and the two results compared:

$$A \frac{230 \text{ m}\mu}{258 \text{ m}\mu}$$

for Poly I:Poly C=0.88;

$$A \frac{230 \text{ m}\mu}{258 \text{ m}\mu}$$

for N-oxidised product=1.56.

A second sample of the N-oxidised product was then subjected to chromatographic separation on a Sepharose 2B column (gel filtration). This was carried out using a column 90 cm. long, internal diameter 2.5 cm., volume approx. 500 ml. The column was eluted in an upward direction with a solution containing sodium chloride (0.15 M), tris buffer (0.05 N) and magnesium chloride (0.005 M) pH 7.5 at a flow rate of 0.4 ml. per minute. Fractions containing 7.2 ml. were each collected and assayed for content of N-oxidised product (estimated by the strenth of U.V. absorption at 258 m$\mu$). It was found that the product was eluted from the Sepharose 2B column in the same way as the Poly I:Poly C starting material—thus indicating that the N-oxidised product has about the molecular weight and overall shape as the starting material and was therefore completely double-stranded.

A third sample of the N-oxidised product was examined in order to obtain its hyperchromicity and its $Tm$ value. The measurements were carried out in 1 cm. cells using a Unicam SP800B spectrometer and a solution of the sample in 0.03 N aqueous sodium chloride containing 1% ethylene glycol. The solution temperature was elevated by ½° C. every minute and the U.V. absorption was plotted against temperature. It was found that the N-oxidised product and a $Tm$ of 45° C. and a hyperchromicity of 52.9%.

The N-oxidised product afforded protection to mice when administered by the intraperitoneal route at concentrations of 10$\gamma$ and 100$\gamma$ per mouse challenged 24 hours later with encephalomyocarditis virus administered by the same route, the results being as follows:

TABLE 1

| N-oxide dose | Virus dose | Mortality within 12 days in— | |
|---|---|---|---|
| | | Animals receiving N-oxide | Controls receiving no N-oxide |
| 10γ | 10⁻⁴ | 4/10 | 10/10 |
| 100γ | 10⁻⁴ | 4/10 | 10/10 |

The effect of the N-oxidised product on the immune response of mice was investigated as follows:

Mice were immunised by intravenous injection of a 10% suspension of sheep red blood cells. The compound to be tested was injected simultaneously by the same route.

The effect of the compound was assayed on the third day by means of the "localised haemolysis in gel technique." This proceddure was a modified version of the "Jerne Plaque Assay" originally described by Jerne Norden and Henry. ("Cell Bound Antibodies" Wistar Inst. Press, Philadelphia, 1963, p. 109–Ed. Amos and Koprowski).

Mice were sacrificed and the spleens removed. These were teased apart to release lymphoid cells. The spleens of 5 mice were pooled for each compound tested. After suitable dilution in culture medium 0.1 ml. suspensions of spleen cells was mixed with liquid agar and sheep red blood cells and poured into a Petri dish to form a thin layer. After two hours incubation at 37° C. antibody had diffused into the surrounding agar from certain of the cells. Addition of complement (Guinea Pig serum) serum to lyse the sheep red blood cells in the areas where antibody is present. After further incubation to allow lysis of the red cells the plates were placed under a colony counter (magnifier with indirect light source) and the areas of lysis ("plaques") counted. These appear as clear areas against the opaque red background of unlysed red cells.

A cell count was performed on a sample of the cell suspension after plating. Results are expressed as plaque forming cells (PFC) per million spleen cells or per spleen.

Effect of the compound (the "immunological index") is expressed as the ratio of PFC/10⁶ in the treated animals; those in the control (dosed with saline) group. Thus a ratio of 1.0 represents no effect. Below 1.0 represents immunosuppression and above is adjuvancy.

Results:
Immunological index:
at 10γ=1.39
at 100γ=1.38 the N-oxidised product therefore showed an adjuvancy effect in enhancing the immune response.

EXAMPLE 2

N-oxidation of Poly C (a) Polyribocytidylic acid (20.0 mg. as the potassium salt) was dissolved in 0.4 M aqueous potassium acetate, pH 8.2 (20 ml.) and a solution of m-chloroperbenzoic acid (500 mg.) in ethanol (10 ml.) added. The solution was allowed to remain at 20° for 5 minutes and then ethanol (60 ml.) was added. The precipitate was separated by centrifugation and washed with ethanol (2×100 ml.).

A sample of the N-oxidised product obtained in this way was dissolved in 0.15 M aqueous sodium chloride and the ratio $$A \frac{230 \text{ nm.}}{270 \text{ nm.}}$$

was determined. The ratio $$A \frac{230 \text{ nm.}}{270 \text{ nm.}}$$

was unoxidised Poly C was then measured and the results compared:

$$A \frac{230 \text{ nm.}}{270 \text{ nm.}}$$

for Poly C=0.93;

$$A \frac{230 \text{ nm.}}{270 \text{ nm.}}$$

for N-oxidized product=1.09.

For cytidine-N-oxide the corresponding U.V. absorption maxima occur at 225 and 272 nm., and the $$A \frac{225 \text{ nm.}}{272 \text{ nm.}}$$

ratio is 3.36.

From these values it is possible to calculate an approximate value for the percent of bases oxidised in Poly C.

$$\text{Percent bases oxidised} = \frac{1.09 - 0.93}{3.36 - 0.93} = 6\%$$

(b) Polyribocytidylic acid was treated with m-chloroperbenzoic acid exactly as in Example 1 with the sole exception that the reaction time was increased to 20 minutes.

$$A \frac{230 \text{ nm.}}{270 \text{ nm.}} \text{ for N-oxidised product} = 1.36;$$

$$\therefore \text{ percent bases oxidised} = \frac{1.36 - 0.93}{3.36 - 0.93} = 17\%.$$

(c) Polyribocytidylic acid was treated with m-chloroperbenzoic acid exactly as in Example 1 with the sole exception that the reaction time was increased to 60 minutes.

$$A \frac{230 \text{ nm.}}{270 \text{ nm.}} \text{ for oxidised product} = 1.56;$$

$$\therefore \text{ percent bases oxidised} = \frac{1.56 - 0.93}{3.36 - 0.93} = 26\%.$$

(d) To a solution of monoperphthalic acid (500 mg.) in ether (6.3 ml.), water (10 ml.) was added and the ether was removed at reduced pressure. The aqueous solution was adjusted to pH 7 with N sodium hydroxide and a solution of polyribocytidylic acid (20.0 mg. as the potassium salt) in water (20 ml.), pH 7, added. The solution was allowed to remain at 37° for 60 minutes and then ethanol (70 ml.) was added. The precipitate was separated by centrifugation and washed with ethanol (2×100 ml.).

As in Example 1 the $$A \frac{230 \text{ nm.}}{270 \text{ nm.}}$$

ratio for the N-oxidised product in 0.15 M NaCl was determined.

$$A \frac{230 \text{ nm.}}{270 \text{ nm.}} = 1.59;$$

$$\therefore \text{ percent bases oxidised} = \frac{1.59 - 0.93}{3.36 - 0.93} = 27\%.$$

(e) Annealing of N-oxidized Poly C with Poly I: Each of the N-oxidized products obtained in steps (a)-(d) obtained from polyribocytidylic acid (10.0 mg. as the potassium salt) was dissolved in 0.15 M NaCl (10 ml.) and a solution of polyriboinosinic acid (10.0 mg., as the potassium salt) added.

The ratio of the U.V. absorption at 230 nm. to that at 258 nm.

$$\left( A \frac{230 \text{ nm}}{258 \text{ nm}} \right)$$

was determined for each solution. The same was done for a solution of poly I:Poly C prepared from Poly I and Poly C in the same manner.

The solutions were also examined in order to obtain hyperchromicities and $T_m$ values, and hence a measure of the degree of annealing that had occurred between the complementary polyribonulceotide strands.

The measurements were carried out in 1 cm. cells using a Unicam SP800B spectrometer. The solution temperature was elevated by ½° C. per minute and the U.V. absorption at 250 nm. plotted against temperature.

The results from these experiments are tabulated below.

TABLE 1

| Duplex | $A \dfrac{230 \text{ nm.}}{258 \text{ nm.}}$ | Hyperchromicity percent (250 nm.) | $T_m$, ° C. |
|---|---|---|---|
| Poly I:Poly C | 0.84 | 75.0 | 63 |
| Poly I:Poly C 6% N-oxide | 0.92 | 66.1 | 57 |
| Poly I:Poly C 17% N-oxide | 1.05 | 25.6 | (¹) |
| Poly I:Poly C 26% N-oxide | 1.18 | 0 | |
| Poly I:Poly C 27% N-oxide | 1.59 | 0 | |

¹ Melting too broad and ill defined for $T_m$.

From these results it is apparent that when more than 26% of the bases in Poly C are oxidized it no longer complexes with Poly I in 0.15 M NaCl at 20° C., to any appreciable extent.

EXAMPLE 3

N-oxidation of Poly I:Poly C

Polyribocytidylic acid (10.0 mg. as the potassium salt) and polyriboinosinic acid (10.0 mg. as the potassium salt) were dissolved in 0.4 M aqueous potassium acetate, pH 8.2 (20 ml.) and a solution of m-chloroperbenzoic acid (500 mg.) in ethanol (10 ml.) added. The solution was allowed to remain at 20° for 60 minutes and then ethanol (60 ml.) was added. The precipitate was separated by centrifugation and washed with ethanol (2× 100 ml.).

A sample of the N-oxidized product obtained in this way was dissolved in 0.3 M aqueous sodium chloride containing 1% ethylene glycol and the ratio $$A \dfrac{230 \text{ nm.}}{258 \text{ nm.}}$$

measured. The ratio $$A \dfrac{230 \text{ nm.}}{258 \text{ nm.}}$$

for unoxidized Poly I:Poly C was then measured and the two results compared:

$$A \dfrac{230 \text{ nm.}}{258 \text{ nm.}}$$

for Poly I:Poly C=0.84;

$$A \dfrac{230 \text{ nm.}}{258 \text{ nm.}}$$

for N-oxidized product=1.56.

The rate of change of the ratio $$A \dfrac{230 \text{ nm.}}{258 \text{ nm.}}$$

with increasing N-oxidation of the Poly C strand in Poly I:Poly C can be determined from the results (given in Table 1). Since under identical reaction conditions Poly I underwent no detectable N-oxidation, it can be concluded that upon N-oxidation of Poly I:Poly C only the cytidine residues are oxidized, and consequently the approximate percent of cytidine residues oxidized in the Poly I:Poly C can be calculated.

$$\text{percent bases oxidised} = \dfrac{26(1.56-0.84)}{1.18-0.84} = 58\%.$$

A second sample of the N-oxidized product was then subjected to chromatographic separation on a Sepharose 2B column (gel filtration). This was carried out using a column 90 cm. long, internal diameter 2.5 cm., volume approx. 500 ml. The column was eluted in an upward direction with a solution containing sodium chloride (0.15 M), tris buffer (0.05 M) and magnesium chloride (0.005 M) pH 7.5 at a flow rate of 0.4 ml. per minute. Fractions containing 7.2 ml. were each collected and assayed for content of N-oxidized product (estimated by the U.V. absorption at 258 nm.). It was found that the product was eluted from the Sepharose 2B column in the same fractions as the Poly I:Poly C starting material—thus indicating that the N-oxidized product has the same molecular weight and overall shape as the starting material and was therefore double stranded.

A third sample of the N-oxidized product was examined in order to evaluate its hyperchromicity and $T_m$ value. The measurements were carried out in 1 cm. cells using a Unicam SP800B spectrometer and a solution of the sample in 0.03 M aqueous sodium chloride containing 1% ethylene glycol. The solution temperature was elevated by ½° C. per minute and the U.V. absorption at 250 nm. was plotted against temperature. It was found that the N-oxidised product had a 52.9% hyperchromicity with a $T_m$ of 45°.

EXAMPLE 4

A solution of polyriboinosinic acid; polyribocytidylic acid (20 mg.) was dissolved in 0.4 M aqueous potassium acetate, pH 8.2 (20 ml.) and the solution kept at 37° for 3 hrs. The solution was then cooled to 20° and a solution of m-chloroperbenzoic acid (500 mg.) in ethanol (10 ml.) added. The solution was allowed to remain at 20° for 20 minutes and then ethanol (60 ml.) was added. The precipitate was separated by centrifugation and washed with ethanol (2× 100 ml.).

A sample of N-oxidized product obtained in this way was dissolved in 0.15 M aqueous sodium chloride and the ratio $$A \dfrac{230 \text{ nm.}}{258 \text{ nm.}}$$

determined.

$$A \dfrac{230 \text{ nm.}}{258 \text{ nm.}} = 0.93;$$

$$\therefore \text{ percent cytosine bases oxidized} = \dfrac{26(0.93-0.84)}{1.18-0.84}$$

$$= 7\%.$$

The hyperchromicity and $T_m$ of the N-oxidized material were determined in 0.15 M NaCl as for Example 1. It was found that the N-oxidized product had a 71.1% hyperchromicity at 250 nm. with a $T_m$ of 60°.

EXAMPLE 5

A further 20 mg. of Poly I:Poly C was treated in exactly the same manner as in Example 4 with the sole exception that the time of exposure to m-chloroperbenzoic was increased to 60 minutes.

The value for the ratio $$A \dfrac{230 \text{ nm.}}{258 \text{ nm.}} = 0.98 \text{ for this product};$$

$$\therefore \text{ percent cytosine bases oxidized} = \dfrac{26(0.98-0.84)}{1.18-0.84}$$

$$= 11\%.$$

The hyperchromicity and $T_m$ of the N-oxidized material were determined in 0.15 M NaCl as for Example 4. It was found that the N-oxidized product had a 65.9% hyperchromicity at 250 nm. with a $T_m$ of 60°.

Comparison of the degrees of oxidation obtained in Examples 4 and 5 with that in Example 3 indicates that single stranded regions of the duplex are preferentially oxidized. Holding a solution of Poly I:Poly C at 37° is known to increase the degree of bonding between complementary bases.

EXAMPLE 6

Additional biological data

The double stranded N-oxidized products of Examples 5, 7, 8 and 10 all afforded protection to mice of the CD1 strain weighing 15-20 g., when administered by the intraperitoneal route, at concentration of 10 μg. per mouse, challenged 24 hours later with encephalomyocarditis virus administered by the same route, the results being as

TABLE 2

| N-oxide | Dose (μg. per mouse) | Virus dose ($LD_{50}$'s of virus) | Mortality within 12 days in— | |
|---|---|---|---|---|
| | | | Animals receiving N-oxide | Control animals receiving no N-oxide |
| Poly I:Poly C 6% N-oxide (Example 2) | 10 | 20 | 5/10 | 19/10 |
| | 100 | 20 | 4/10 | 19/10 |
| Poly I:Poly C 17% N-oxide (Example 2) | 10 | 20 | 9/10 | 19/20 |
| | 100 | 20 | 5/10 | 19/20 |
| Poly I:Poly C 58% N-oxide (Example 3) | 10 | 20 | 4/10 | 19/20 |
| | 100 | 20 | 4/10 | 19/20 |
| Poly I:Poly C 11% N-oxide (Example 5) | 10 | 32 | 5/10 | 19/20 |
| | 10 | 320 | 8/10 | 19/20 |

It is of interest to observe that double stranded characteristics and antiviral activity are retained at much higher levels of oxidation when the duplex Poly I:Poly C is oxidized (e.g. as in Example 3) than when the Poly C is oxidized and then annealed with Poly I (e.g. as in Example 2).

The procedure of Example 5 was repeated and a double-stranded N-oxide of Poly I:Poly C was produced which was 16% oxidised. (The original N-oxide produced by Example 5 was only 11% oxidised, but the difference is probably due to the fact that a different batch of starting material was employed).

In order to test the acute toxicity of the 16% N-oxidised Poly I:Poly C, groups of mice strain CD1 were dosed intraperitoneally with varying amounts of the N-oxide in phosphate buffered saline, pH 7.0. The mice were observed over a period of 7 days and the total number of deaths in each group were recorded. The results are given in Table 3.

TABLE 3

| | Dosage (mg./kg.) | Mortality/number of mice per group |
|---|---|---|
| Poly I:Poly C | 10 | 0/10 |
| | 20 | 0/10 |
| | 40 | 0/10 |
| | 80 | 6/10 |
| Poly I:Poly C, 16% N-oxide | 10 | 0/10 |
| | 20 | 0/10 |
| | 40 | 0/10 |
| | 80 | 2/10 |
| | 120 | 2/10 |
| | 160 | 1/8 |

These results indicate that the acute toxicity of the 16% N-oxide is less than that of the starting material.

Reduction in acute toxicity was also observed with N-oxides of Poly I:Poly C whose degree of oxidation ranged from 10% to 58% of the cytosine residues.

What is claimed is:

1. An N-oxide of Poly I:Poly C or a pharmaceutically acceptable non-toxic salt thereof, said N-oxide or salt being itself double-stranded.

2. An N-oxide of Poly I:Poly C or a non-toxic pharmaceutically acceptable salt thereof in admixture with a pharmaceutically acceptable carrier.

3. An N-oxide non-toxic salt according to claim 1 wherein the salt is pharmaceutically acceptable and is an alkali metal salt.

References Cited

UNITED STATES PATENTS 3,317,511  5/1967  Kawashima et al. _ 260—211.5 R
3,652,538  3/1972  Niblack _____ 260—211.5 R LEWIS GOTTS, Primary Examiner J. R. BROWN, Assistant Examiner U.S. Cl. X.R.

424—85